United States Patent [19]

Turner

[11] Patent Number: 4,674,099
[45] Date of Patent: Jun. 16, 1987

[54] RECYCLING OF GASES FOR AN EXCIMER LASER

[76] Inventor: Robert E. Turner, 60 Prospect St., Huntington, N.Y. 11743

[21] Appl. No.: 605,772

[22] Filed: May 1, 1984

[51] Int. Cl.⁴ ............................................. H01S 3/22
[52] U.S. Cl. ...................................... 372/59; 372/57; 372/60
[58] Field of Search ............... 372/59, 57, 60; 372/89, 372/90

[56] References Cited

U.S. PATENT DOCUMENTS

| | | | |
|---|---|---|---|
| 3,566,304 | 2/1971 | Neusel et al. | 372/59 |
| 3,648,194 | 3/1972 | Melikian et al. | 372/59 |
| 3,876,957 | 4/1975 | Thatcher | 372/59 |
| 4,417,340 | 11/1983 | Horiuchi et al. | 372/59 |
| 4,514,698 | 4/1985 | Blumenthal et al. | 372/59 |

OTHER PUBLICATIONS

Johnson et al; "A Closed-Cycle Gas Recirculating System for Rare-Gas Halide Excimer Lasers"; Appl. Phys. Lett., 32(5), Mar. 1, '78.
Fradin et al; "A Recirculating, Self-Contained DF/HF Pulsed Laser"; IEEE JQE, 11(3), Part 1, p. 631, Aug. 1975.
Christensen; High-Repetition-Rate XeF Laser with Gas Recycling"; Appl. Phys. Lett., vol. 30, No. 9, May 1, 1972.

*Primary Examiner*—Leon Scott, Jr.
*Attorney, Agent, or Firm*—Roberts, Spiecens & Cohen

[57] ABSTRACT

For an excimer laser system utilizing in a laser chamber a lasing material and a mixture of a diluent rare gas and a heavy rare gas and halogen rare gas in given percentages there is disclosed a method and apparatus for reducing the expenditure of the rare gases by continuously evacuating the laser mixture from the laser chamber removing from the evacuated laser mixture any foreign halogen compounds to provide a cleaned laser mixture and thereafter feeding the cleaned lasing mixture back into the laser chamber. Along with the cleaned laser mixture there is fed in a supplementing lasing material which is a mixture of the halogen gas, the diluent gas and the heavy rare gas. The percentage of the halogen gas in the supplemental material is substantially greater than the given percentage in the lasing chamber while the percentages of the diluent gas and the heavy rare gas are substantially the same as the percentage ratios of the given percentages. To prevent laser system pressure from changing as the supplemental material is added to the system there is disclosed a method for venting the lasing material to maintain constant laser system pressure.

20 Claims, 2 Drawing Figures

CLOSED CYCLE EXCIMER LASER SYSTEM

CLOSED CYCLE EXCIMER LASER SYSTEM

CLEANUP MEANS 12

RECYCLING OF GASES FOR AN EXCIMER LASER

BACKGROUND OF THE INVENTION

This invention pertains to excimer lasers and more particularly to the conservation of the gases used in an excimer laser.

One of the most successful new laser technologies to have emerged in recent years is a new family of powerful gas lasers called excimer lasers. These lasers are unique in that they are efficient sources of high powered ultra-violet light. This property makes these lasers very useful for a wide range of scientific as well as industrial and military operations.

An economic limitation to the long-term use of excimer lasers had been the high cost of operation. A significant portion of this cost has been due to the consumption of expensive rare gases such as krypton, argon or xenon as well as moderately expensive gases such as helium and neon. Ordinarily the lasing gas mixture which is a combination of a heavy rare gas, a diluent rare gas and a halogen gas is fed into the laser and withdrawn from the laser after the lasing has been performed. Because of the cost of the rare gases, the excimer laser can be expensive to operate. However, the present inventor was part of a team which developed a closed-cycle recirculating system for rare gas halide excimer lasers. The results of this invention were published in Applied Physics Letters, Volume 32 (5) on Mar. 1, 1978, starting on page 291 thereof. (This idea is also discussed in Excimer Laser Chemical Problems, Los Alamos National Laboratory document Number Q-8-L-169 . . ) While the proposed system has performed admirably to reduce the cost of the gases by virtue of the fact that the heavy rare gases are cleaned and recirculated after the removal of the halogen and fed back to the laser along with fresh halogen gas, there is a safety problem with such a system when pure halogen gas is used. This is because Halogens are poisonous gases in concentrations greater than 0.1-1 ppm. Furthermore, Halogens are very corrosive. In fact, pure fluorine gas is very pyrophoric, and the greater the concentration, the greater the chance for causing a fire. If the source of the halogen is hydrogen chloride, then there are similar problems. Therefore, excimer laser users tend to use the halogen gas in a dilute form with a diluent gas such as helium. The gas mixtures of halogens and diluent gases are available from sources who have the equipment and knowhow to safely handle the halogens so the laser users do not have to use pure halogens. Nevertheless, in a closed cleanup and recirculation system the feeding of this dilute halogen gas mixture causes a raising of the pressure of the system, since the diluent gas is not removed from the gas stream by the cleanup process. This then requires that the system be vented in order to maintain constant laser pressure. In the course of venting, the proportions of the rare gases will change, as the halogen diluent flushes out the initial gas mixture. This will cause laser performance to deteriorate. The alternative to venting the gas mixture is to use the helium diffuser to selectively remove excess helium. For the gas flow rates encountered in excimer laser cleanup systems, a helium diffuser would have to provide very high rates of diffusion such that the diffusion system would be large, expensive, and probably very fragile, adding little to the overall safety of the system.

BRIEF SUMMARY OF THE INVENTION

It is accordingly a general object of the invention to further minimize the cost of operation of an excimer laser.

It is another object of the invention to reduce the consumption of rare gases in an excimer laser.

It is a further object of the invention to provide for safe replenishing of halogen gases in an excimer laser.

Briefly, the invention contemplates in an excimer laser system utilizing in a laser chamber a lasing material of a mixture of a diluent rare gas, a heavy rare gas and a halogen gas in given percentages, a method of reducing the expenditure of the rare gases. This method contemplates continuously evacuating the lasing material from the laser chamber, removing from the evacuated lasing mixture any halogen compounds and any other non-rare gas material to provide a cleaned lasing mixture and thereafter feeding the cleaned lasing mixture back into the lasing mixture and adding into the lasing mixture a supplemental lasing material comprising a mixture of the halogen gas, the diluent gas and the heavy rare gas. The percentage of halogen gas in the supplemental mixture is substantially greater than the percentage given in the lasing mixture, and the percentages of the diluent rare gas and the heavy rare gas have substantially the same percentage ratios as the ratio of the given operating lasing mixtures.

There is further contemplated venting the lasing mixture to ensure a safe, constant operating pressure in spite of the addition of the supplemental mixture.

BRIEF DESCRIPTION OF DRAWING

Other objects, the features and advantages of the invention will be apparent from the following detailed description when read in conjunction with the accompanying drawings.

In the drawing.

DETAILED DESCRIPTION

Figure 1:
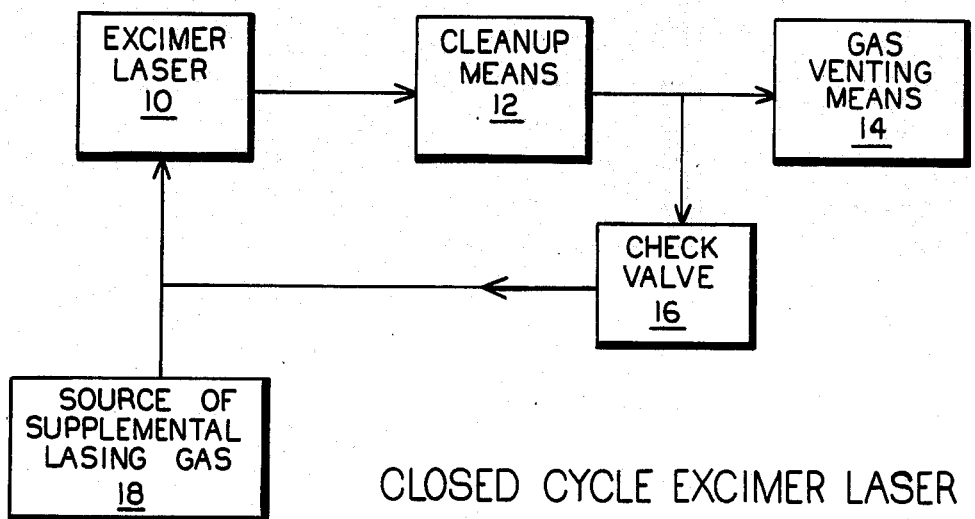
FIG. 1 is a schematic block diagram of a closed-cycled excimer laser system utilizing the invention.

In FIG. 1 the closed-cycle excimer laser system centers around the excimer laser 10. The excimer laser 10 is a conventional design and in its lasing chamber has a gas mixture of a halogen, a heavy rare gas and a diluent rare gas. A typical lasing gas mixture would be a halogen gas such as flourine or gaseous hydrogen chloride in concentrations of 10ths of a percent, a heavy rare gas such as argon, krypton or xenon in concentrations of the order of 2 to 5 percent and a diluent rare gas such as helium and/or neon in concentrations in the order of 95 percent. Because of the lasing action, there are formed gaseous and particulate compounds which if not removed from the laser will eventually reduce the efficiency of operation and finally quench any possible lasing action. Therefore, in accordance with the invention, the lasing mixture is exhausted or removed from the excimer laser 10 and passed through the cleanup means 12. In the cleanup means 12 the halogen compounds are removed from the gas mixture so that at the output of the cleanup means 12 there is a pure gas mixture of the heavy rare gas and the diluent rare gas. The cleaned gas mixture is fed via a check valve 16 back to the excimer laser 10. Since the halogen has been removed it is now necessary to replenish the gas mixture with the halogen gas. Accordingly, there is also fed into the input of the laser 10 a supplemental gas mixture from the source 18. This gas mixture includes the halogen, the heavy rare gas and the diluent rare gas in percentages related to the original gas mixture. In particular, the halogen in the supplemental gas mixture is substantially greater in concentration than the original concentration. In particular, its percentage is at least one order of magnitude greater and typically 50 times greater. Thus, it is not unusual for the supplemental gas mixture to be in the order to 10 percent halogen. The remainder of the supplemental gas mixture is a combination of the heavy rare gas and the diluent rare gas. This combination has the same ratio of percentages as the ratio of percentages in the original gas mixture. For example, if the ratio in the original gas mixture of krypton and helium was say 5 percent to 95 percent or a ratio of 1 to 19 percent then the same ratio prevails in the supplemental gas mixture. Therefore, the ratio of krypton to helium in the supplemental gas mixture will be in the order of 4½ percent krypton and 84½ percent helium, (i.e., 90 percent rare gas).

It should be noted that the introduction of this supplemental gas mixture raises the overall pressure of the system. Accordingly, it is necessary to vent the system when the pressure exceeds a given preset value. Therefore, interpose between the cleanup means 12 and a check valve 16 to prevent backflow, there is provided gas venting means 14 which will open whenever the preset pressure is exceeded. This venting results in only a slight waste of the rare gases since very little supplemental gas mixture is required because of the high percentage of the halogen.

The various components of the system will now be described:

The source of supplemental laser gas 18 can be a cylinder with a metering valve to control the flow of the supplemental gas. The check valve 16 can be a conventional check valve. The gas venting means can be a conventional pressure sensitive valve, a pressure activated switch in combination with an on/off solenoid valve or a pressure transducer in combination with a servo-valve. The first two possibilities give only crude results. Ideally, a linear-pressure transducer should be used in combination with an electronically controlled servo-valve so that there is a smooth venting that does not oscillate over a great range.

Figure 2:
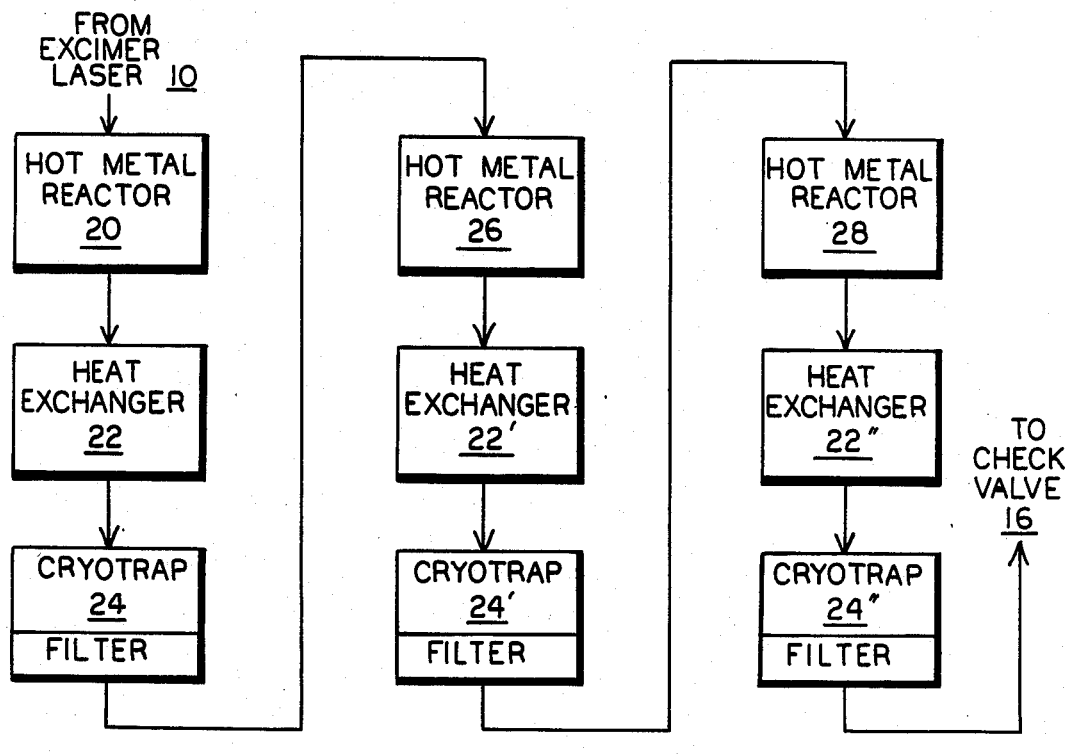
FIG. 2 is a schematic diagram of the cleanup means of the system of FIG. 1.

In FIG. 2 there is shown the cleanup means 12 as a combination of three cleaning elements connected in series. Each cleaning element includes a hot metal reactor followed by a heat exchanger which is followed by a cryotrap-filter combination. A typical hot metal reactor 20 can be a type in which there is included a metal reagent. The metals can be alkali metals such as sodium or lithium, alkaline earth metals such as calcium or barium or transition metals. However, it is preferable when the halogen is fluorine to use a titanium as the reagent and when the halogen is derived from hydrogen chloride to use calcium as the reagent. When titanium is being used, the reactor is heated to at least 200 degrees. And preferably in the range between 300 and 600 degrees (all temperatures are specified as centigrade). The output of the reactor 20 will include the rare gases as well as either halides or flourides in a gaseous state. These gases are now fed through a typical heat exchanger 22 which can be a pipe with a flowing cold water jacket to drop the temperature of the gas to the order of room temperature. This dropping of the temperature causes a major portion of the fluorides or chlorides to precipitate out. However, all of the halides do not precipitate. The moderately cleaned gases are now fed to a cryotrap-filter 24 which again can be a pipe with a jacket through which passes a refrigerant. The cryotrap will drop the temperature of the gases to approximately 40 degrees below zero further forcing more precipitation. Within the cryotrap and in the path of the gases is a filter to remove the precipitates. The other two cleanup elements are similarly constructed. Nevertheless, it should be noted that if the halogen being used by the laser is fluorine, then the hot metal reactor 20 will use titanium and operate at the above specified temperatures. The hot metal reactor 26 of the second element, if the halogen is fluorine, will use either titanium or the metal calcium with temperatures in the range of 600 to 700 degrees. Again if the halogen is fluorine, then the hot metal reactor of the third element will use titanium with an operating temperature of 600 to 900 degrees.

On the other hand, if the halogen is hydrogen chloride, then each one of the hot metal reactors will use calcium having an operating temperature greater than 600 degrees.

There has thus been shown methods and apparatus for conserving rare gases used in excimer gas lasers. The conservation comes not only from recycling and cleanup of the gases, but also in using particular percentages of the gases to supplement the consumed halogen. The use of dilute halogen gas cylinders results in substantially improved' safety. There has also been shown improved apparatus for recycling the gases in the laser.

While only a limited number of embodiments of the invention have been shown and described in detail, there will now be obvious to those skilled in the art many modifications and variations satisfying many or all of the objects of the invention without departing from the spirit thereof.

For example, to minimize the consumption of the rare gases caused by constant venting, it may be desirable to provide a parallel gas circulation loop between the output and input of the lasing chamber and provide in such loop a further cryotrap/filter means. Such means by lowering the temperature of the halogen gas to the point of condensation would perform the dual functions of providing the reservoir of halogen donor and precipitating any condensable gaseous impurities from the laser gas mixture.

What is claimed is:

1. In an excimer laser system utilizing in a laser chamber a lasing material of a first mixture of a diluent rare gas in concentrations of the order of 95%, a heavy rare gas in concentrations of the order of 2-5 percent and a halogen gas in concentrations of the order of 10ths of of a percent the method of reducing the expenditure of the rare gas comprising the steps of continuously evacuating the lasing mixture from the laser chamber, removing from the evacuated lasing mixture any halogen compounds to provide a cleaned lasing mixture, feeding the cleaned lasing mixture into the lasing chamber the improvement comprising, adding to the lasing mixture a supplemental lasing material comprising a second mixture of the halogen gas, the diluent gas and the heavy rare gas, the percentage of halogen gas being substantially greater than 10ths of a percent and the percentage of the diluent gas and the heavy rare gas having substantially the same percentage ratios as in said first mixture of the lasing material and venting the gas mixture whenever the gas pressure exceeds a given gas pressure.

2. The method of claim 1 wherein the heavy rare gas is argon, krypton or xenon, the diluent gas is helium and/or neon and the halogen is fluorine, chlorine, or hydrogen chloride.

3. The method of claim 1 wherein the step of removing halogen compounds comprises passing the lasing mixture through a low temperature region to cryogenically remove halide impurities.

4. The method of claim 3 wherein the step of removing halogen compounds comprises passing the lasing mixture through a first hot metal reactor to form metal halides, and filtering out any formed metal halide particulates.

5. The method of claim 1 wherein the steps of removing halogen compounds comprises passing the lasing mixture through first a hot metal reactor to form metal halides, and filtering out any formed metal halide particulates.

6. The method of claim 1 wherein the step of removing halogen compounds comprises passing the lasing mixture through a hot metal reactor to form metal halide particulates filtering out any metal halide part, then passing the gas mixture through a low temperature region to condense any gaseous impurities including metal halides and then passing the gas mixture through another hot metal reactor operating at a temperature greater than said first hot metal reactor.

7. The method of claim 1 wherein the step of removing halogen compounds comprises passing the lasing mixture through a hot metal reactor to form metal halide particulates filtering out any metal halide part, then passing the gas mixture through a low temperature region to condense any gaseous impurities including metal halides and then passing the gas mixture through another hot metal reactor operating at a temperature greater than said first metal reactor.

8. The method of claim 7 wherein the heavy rare gas is argon, krypton or xenon, the diluent gas is helium and/or neon and the halogen is fluorine, chlorine or hydrogen chloride.

9. Apparatus for conserving the expenditure of a diluent rare gas and a heavy rare gas in an excimer laser system utilizing in a laser chamber a first mixture of the diluent rare gas in concentrations of the order of 95%, the heavy rare gas in concentrations of the order of 2-5 percent and a halogen, said apparatus comprising withdrawing means for continuously withdrawing the gas mixture from the lasing chamber, clean-up means for removing halogen compounds from the withdrawn gas mixture, means for returning the cleaned gas mixture back to the lasing chamber, the improvement comprising means for adding to to the gas mixture a second gas mixture comprising a mixture of the halogen gas, the heavy rare gas and the diluent rare gas, the percentage of the halogen gas being substantially greater than 10ths of a percent and the percentage of the diluent gas and the heavy rare gas having substantially the same percentage ratios as in said mixture and means for venting the gas mixture whenever the gas pressure exceeds a given gas pressure.

10. The apparatus of claim 9 wherein said cleanup means comprises a cryogenic chamber through which the gas mixture passes.

11. The apparatus of claim 9 wherein said cleanup means comprises a titanium hot metal reactor followed by a cryogenic chamber.

12. The apparatus of claim 11 further comprising a high temperature hot metal getter oven downstream of said cryogenic chamber.

13. The apparatus of claim 9 wherein said cleanup means comprises in series a hot metal reactor connected to said withdrawing means, a cryogenic chamber and a high temperature metal getter oven and further comprising gas mixture venting means connected to the outlet of said cleanup means.

14. The apparatus of claim 13 further comprising filter means at least after said hot metal reactor for removing metal halide particulates.

15. The apparatus of claim 13 wherein the metal of the hot metal reactor is different from the metal of the high temperature metal getter oven.

16. The apparatus of claim 9 wherein said filter means is within said cryogenic means.

17. The apparatus of claim 9 wherein said cleanup means comprises in series a first hot metal reactor utilizing a first metal and operating at a temperature above 200° C., a first temperature reducing means for condensing out metal halides, a first filter means associated with said first temperature reducing means for removing the condensed metal halides, a second hot metal reactor utilizing a second metal and operating at a temperature above 600° C., a second temperature reducing means for condensing out metal halides and a second filter means associated with said second temperature reducing means for removing any condensed metal halides.

18. The apparatus of claim 17 wherein one of said metals is titanium and the other of said metals is calcium.

19. The apparatus of claim 18 wherein at least one of said temperature reducing means comprises a heat exchanger followed by a cryogenic trap and the associated filter means is within said cryogenic trap.

20. The apparatus of claim 17 wherein both of said metals are calcium.

* * * * *